(Model.)
A. C. SCARR.
Reaping Machine.
No. 235,903. Patented Dec. 28, 1880.
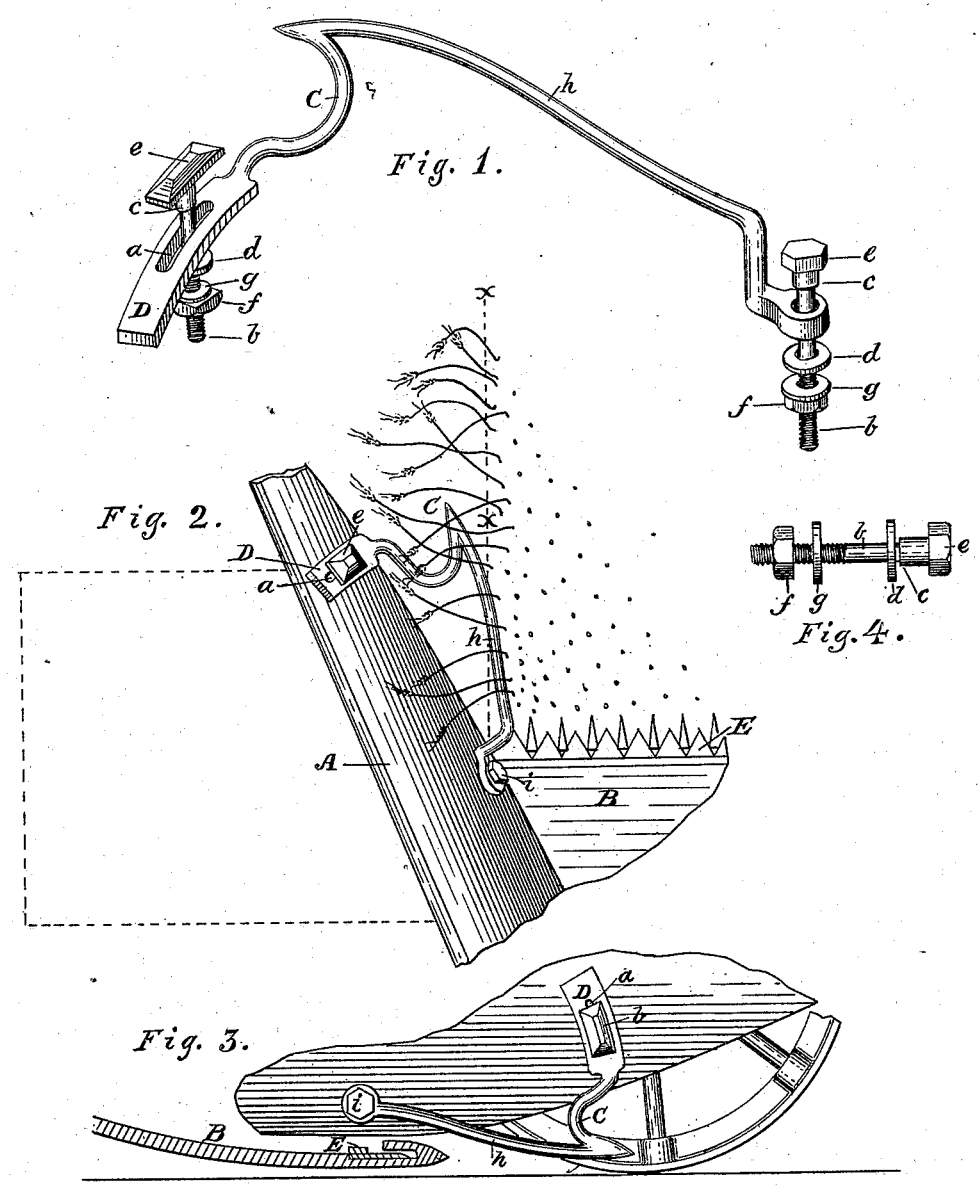

UNITED STATES PATENT OFFICE.

ABRAHAM C. SCARR, OF MARYBOROUGH TOWNSHIP, WELLINGTON COUNTY, ONTARIO, CANADA.

REAPING-MACHINE.

SPECIFICATION forming part of Letters Patent No. 235,903, dated December 28, 1880.

Application filed July 15, 1880. (Model.) Patented in Canada June 15, 1880.

*To all whom it may concern:*

Be it known that I, ABRAHAM CALVERT SCARR, of Maryborough township, in Wellington county, in the Province of Ontario, Canada, have invented a new and useful Improvement in Reaping-Machines; and I do hereby declare that the following is a full, clear, and exact description thereof, reference being had to the accompanying drawings, and to the letters of reference marked thereon, making a part of this specification.

My invention relates to improvements in grain-reaping implements; and the object sought to be attained thereby is the lifting and saving of fallen or lodged grain, much of which would be passed over and lost by the reapers hitherto made, as they have never to my knowledge been provided with any appliance to answer this particular purpose.

It may be remarked that in harvesting grain a considerable portion of the grain-stalks immediately adjoining the swath just cut will drop outward, and often fall flat upon the stubble as soon as the machine has passed, and taken away their former support on that side, and are overridden by the machine on its next passage, and are thus lost. It is the securing and saving of these stray heads of grain that I have had in view in the production of my invention, the application and working of which are hereinafter fully described.

In the annexed drawings, Figure 1 is a detail view of my grain lifter and saver. Fig. 2 is a part plan view, showing the operation of lifting the fallen heads of grain and conducting them to the sickles. Fig. 3 is a part elevation of the reaper with my grain lifter and saver also attached; and Fig. 4 shows the shape of the bolts by which the grain lifter and saver is attached to the reaper.

A represents the gathering-board of the machine, reaching from the table B in an angling direction forward to a point in advance of the working-gears of the machine. This gathering-board is used in some shape in all kinds of reapers, and serves to some extent to prevent the standing grain from falling under the machine.

The part marked C is the hook of the grain-lifter. It is suspended from the gathering-board by the arm D, in which is made the slot $a$. Through this slot extends the bolt $b$, which is formed as shown in Fig. 4, having the shoulder $c$, which keeps the front washer, $d$, at a certain distance from the head $e$, and prevents any binding of the grain-lifter between them. These bolts are tightened firmly to the gathering-board by the nuts $f$, that part of the bolt between the two washers $d$ and $g$ passing through the gathering-board.

Several holes for the bolt that holds the forward end of the grain-lifter may be made in the gathering-board at different heights, so that the hook C may be kept in any desired distance from the ground. The point of the hook C is in advance of the sickle E at a distance of about sixteen or twenty inches, and the machine should be driven so that the point of the hook will be about two inches from the line of the standing grain. The point of the hook skims along over the ground and picks up the fallen heads from the stubble, as shown in Fig. 2, when they are held up by the tail $h$ of the grain-lifter until they are met by the sickle and cut off near their roots and saved with the other grain. The rear end of the tail $h$ is loosely pivoted to the gathering-board by the bolt $i$ at a suitable distance above the sickle, and the slot $a$ in the arm D being in the arc of a circle described from the center of the bolt $i$, the forward or hook end of the grain-lifter rises and falls loosely to the extent of the length of the slot $a$. The forward end of the tail-piece $h$, where it meets the hook C, is slightly turned up, so that with the loose up-and-down play of the hook end of the grain-lifter it will easily be thrown up and slide over any obstacle that it might come in contact with, and thus obviates all risk of its being broken in that way.

The space inclosed by dotted lines shows the relative position of the running-gear.

Having thus fully described my invention, what I claim is—

A grain lifting and saving appliance for attaching to reaping-machines, consisting mainly of the hook C, arm D, slot $a$, tail $h$, and bolts $b$ and $i$, as shown and described, and for the purpose set forth.

ABRAHAM CALVERT SCARR.

Witnesses:
GEORGE SCARR,
W. C. MEDILL.